United States Patent [19]
Ho et al.

[11] Patent Number: 6,044,141
[45] Date of Patent: Mar. 28, 2000

[54] METHOD AND SYSTEM FOR PROVIDING VIRTUAL AGENTS FOR TELEPHONY SERVICES

[75] Inventors: Stephanie Ho, Grapevine; Gregory Utas, Irving, both of Tex.

[73] Assignee: Nortel Networks Corporation, Montreal, Canada

[21] Appl. No.: 08/948,443

[22] Filed: Oct. 10, 1997

[51] Int. Cl.[7] .............................. H04L 12/28; H04M 3/42
[52] U.S. Cl. .......................... 379/210; 370/410; 379/211
[58] Field of Search .................................... 379/210–213; 370/410, 522, 524, 531, 259

[56] References Cited

U.S. PATENT DOCUMENTS

| | | | |
|---|---|---|---|
| 5,274,700 | 12/1993 | Gechter et al. | 3749/210 |
| 5,369,695 | 11/1994 | Chakravarti et al. | 379/211 |
| 5,416,834 | 5/1995 | Bales et al. | 379/211 |
| 5,481,602 | 1/1996 | Griffiths et al. | 379/210 |
| 5,590,186 | 12/1996 | Liao et al. | 379/210 |
| 5,892,819 | 4/1999 | Stumer | 379/211 |
| 5,937,056 | 8/1999 | Coyne et al. | 379/221 |

OTHER PUBLICATIONS

Greg Utas, Call Processing Frameworks, pp. 1–48.
BNR Proprietary, 1. HLD and Design description, Jul. 3, 1996, pp. 1–45.
Slides—Virtual Agents for Telephony Services, Patent Presentation, 1997, Stephanie Ho.

*Primary Examiner*—Chi H. Pham
*Assistant Examiner*—Brenda H. Pham
*Attorney, Agent, or Firm*—John D. Crane; Felsman, Bradley, Vaden, Gunter & Dillon, LLP

[57] ABSTRACT

A method and system in a communications network for managing multipath calls by establishing virtual communications nodes for effectively handling the automatic routing of communications transactions initiated within the communications network. A communications transaction is initiated from an originating node to a desired terminating node. The communications transaction is then automatically routed from the originating node to an alternative terminating node, in response to a predetermined control parameter, by associating a first virtual communications node with a first terminal of the desired terminating node, and associating a second virtual communications node with a second terminal of the desired terminating node. Completion of the automatic routing of the communications transaction to the alternative terminating node is accomplished by terminating the communications transaction at the alternative terminating node by routing the communications transaction through the first virtual communications node and the second communications node such that a multipath call placed from the originating node to the alternative terminating node is represented as a group of series of connections rather than a direct connection between the originating node and the alternative terminating node.

12 Claims, 8 Drawing Sheets

METHOD AND SYSTEM FOR PROVIDING VIRTUAL AGENTS FOR TELEPHONY SERVICES

BACKGROUND OF THE INVENTION

1. Technical Field

The present invention relates in general to an improved communications system. In particular, the present invention relates to an improved communications system in which wireline and mobile communication devices can be utilized to initiate communication transactions. Still more particularly, the present invention relates to an improved communications system in which virtual agents can be utilized to redirect and route calls between originating and terminating users.

2. Description of the Related Art

Communication networks such as wireless and wireline telephone systems are well-known in the prior art. A wireline based communications system utilizes a physical path to transmit signals. Examples of wirelines communications systems include telephone, telegraph, facsimile, closed circuit television and so forth. Examples of wireless communication systems include cellular telephone systems. A cellular telephone system typically includes cellular subscriber units that can be mobile or portable, and cellular base stations which are connected to the public telephone company via one or more cellular switching networks. Each cellular subscriber has an assigned cellular telephone number which allows the user (i.e., the cellular subscriber) to place and receive calls within a widespread range of the cellular base stations, such as throughout a metropolitan area.

Computerized switching is essential to the operation of both wireline and wireless telephone communication systems. Telephone communication networks typically provide features for redirecting calls on behalf of telephone users. Examples of such features include call forwarding, call transfer, release link trunking, and simultaneous ringing, all well known in the communications arts. Call forwarding, for example, is a network-provided service feature in which calls may be redirected from the originally called address to another address specified by a call forwarding party. A common approach utilized to redirect a call is to remove a redirecting user from a call configuration. In such an approach a call is initiated from user A to user B, who redirects the call to user C. The call is physically represented as a call from user A to user C. User B has been largely removed.

However, the resulting A-to-C call contains special flags and data indicating that the call was actually redirected by B, which results in numerous software "hooks" to determine whether the flags have been set, and if so to fix the behavior of what now erroneously appears to be a direct A-to-C call. Information relating to the A-B call is thus hidden and unaccounted for in tracking a call from A to B and then to C. Call setup and billing software, in particular, end up containing many such hooks, whose root cause is the physical removal of B from the call configuration. The resulting design is highly error-prone and expensive to maintain. From the foregoing it can be seen that a need exists for a method and system utilized in telephony services which would allow a user to efficiently and accurately track a redirected call, which is a critical factor in reducing life cycle costs associated with redirection services.

SUMMARY OF THE INVENTION

It is therefore one object of the present invention to provide an improved communications system.

It is therefore another object of the present invention to provide an improved communications system in which wireless and wireline communication devices can be utilized to initiate communication transactions.

It is yet another object of the present invention to provide an improved communications system in which virtual agents can be utilized to redirect and route calls between originating and terminating users.

The above and other objects are achieved as is now described. A method and system in a communications network are disclosed for managing multipath calls by establishing virtual communications nodes for effectively handling the automatic routing of communications transactions initiated within the communications network. A communications transaction is initiated from an originating node to a desired terminating node. The communications transaction is then automatically routed from the originating node to an alternative terminating node, in response to a predetermined control parameter, by associating a first virtual communications node with a first terminal of the desired terminating node, and associating a second virtual communications node with a second terminal of the desired terminating node. Completion of the automatic routing of the communications transaction to the alternative terminating node is accomplished by terminating the communications transaction at the alternative terminating node by routing the communications transaction through the first virtual communications node and the second communications node such that a multipath call placed from the originating node to the alternative terminating node is represented as a group of series of connections rather than a direct connection between the originating node and the alternative terminating node.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
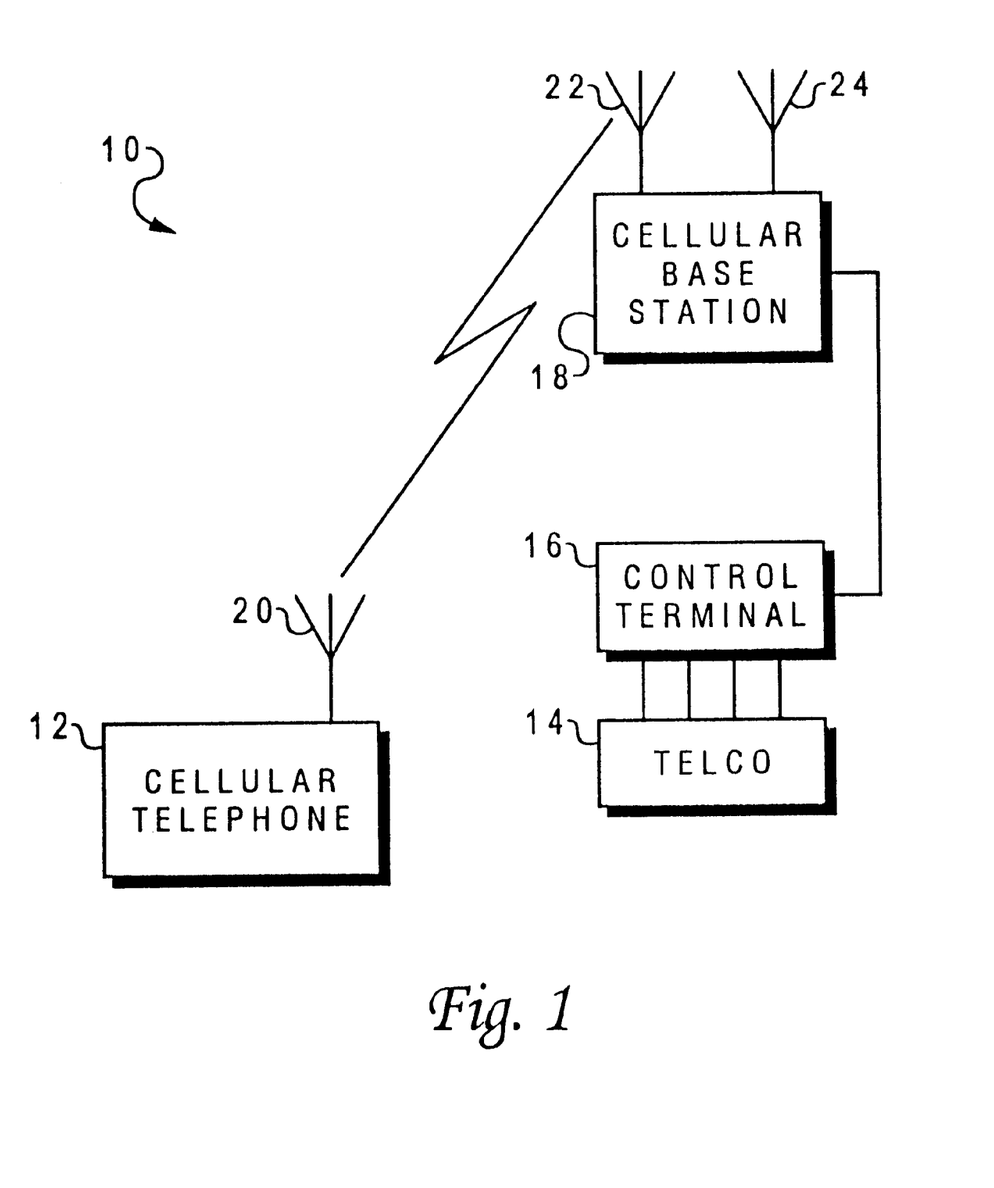
FIG. 1 illustrates a block diagram illustrative of a cellular telephone system in which a preferred embodiment of the present invention may be implemented.

With reference now to the figures and in particular with reference to FIG. 1, there is depicted a block diagram of a cellular telephone system 10 in which a preferred embodiment of the present invention may be implemented. The cellular telephone system 10 depicted in FIG. 1 includes a telephone company phone system (TELCO) 14, connected by telephone landlines to a control terminal 16 which in turn is coupled, also by telephone landlines, to a cellular base station 18 that is located in a cell of a mobile cellular telephone system. Those skilled in the art will appreciate that cellular telephone system 10 is one type of a communications system which may be utilized in accordance with a preferred embodiment of the present invention. For example, noncellular, wireline and other such implemented telephone systems may be utilized in accordance with a preferred embodiment of the present invention. Cellular telephone system 10 as described herein is presented for illustrative purposes only.

Cellular telephone 12 communicates with cellular base station 18 via antennas 22 and 20. Antennas 22 and 20 can be implemented as telescopic whip antennas that extend or retract (i.e., lengthen or shorten), by being constructed in the form of overlapping concentric cylinders that slide inside of each other and make electrical contact with each other. It will be appreciated by those skilled in the art that such antennas are, of course, only examples of antennas that can be utilized with a cellular telephone system such as cellular telephone system 10. A wide variety of other antennae can also be utilized in conjunction with a wireless communication system such as cellular telephone system 10. Also, the landlines utilized in association with cellular telephone system 10 are lines that can be placed in areas on land or inland waterways, and can include twisted-pair lines, coaxial cables, and fiber optic cables utilized in overhead, direct buried, underground, microwave, and satellite applications.

Additional cellular base stations may be located throughout a geographic area to provide telephone service to cellular telephones 12. Cellular base station 18 incorporates both a receiver antenna 22 and a transmitter antenna 24 for communicating with cellular telephones 12. Cellular telephone 12 may be a mobile-unit installed in a vehicle, a transportable unit which is a mobile-unit and battery installed in a carrying case, or a hand-held portable unit. Cellular telephone 12 includes an antenna 20 for the cellular radio channels. In the United States, the cellular radio channels are in the frequency band from 824–894 MHz. More particularly, in the United States, a total bandwidth of 50 MHz is allocated for cellular mobile service, the 50 MHz distributed between 824 MHz and 849 MHz, and 869 MHz and 894 MHz of the frequency spectrum. Also, recently the FCC has auctioned off bandwidths in the 1.9 GHz range. All of these bands can be utilized in accordance with a preferred embodiment of the present invention.

Figure 2:
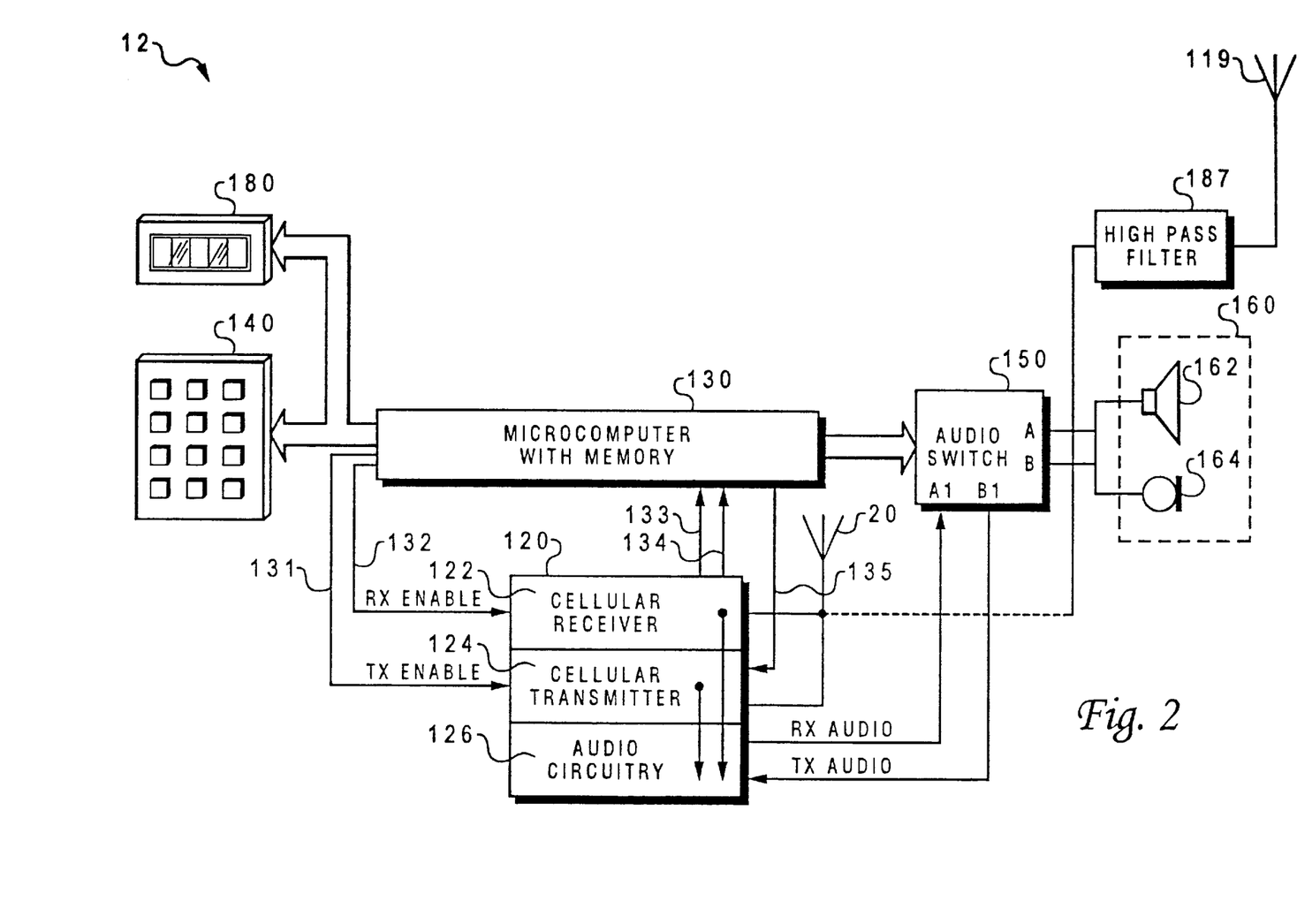
FIG. 2 depicts a block diagram illustrative of a cellular telephone which may be implemented in accordance with a preferred embodiment of the present invention.

FIG. 2 is a block diagram of a cellular telephone 12 which may be implemented in accordance with a preferred embodiment of the present invention. Cellular telephone 12 includes antenna 20, cellular telephone transceiver 120, microcomputer 130, keypad 140, display 180, audio switch 150, and handset 160, including speaker 162 and microphone 164. Microcomputer 130 is a computer built around a single chip microprocessor. Less powerful than minicomputers and mainframe computers, microcomputer 130 is nevertheless capable of complex tasks involving the processing of logical operations. Microcomputer 130 includes a central processing unit (CPU) (i.e., not shown), which is the computational and control unit of microcomputer 130, and which interprets and executes instructions for cellular telephone 12.

Alternatively, cellular telephone transceiver 120 may be coupled to a single antenna 119 in place of antenna 20 and by way of high-pass filter 187, respectively. High-pass filter 187 is utilized to filter only those signals which fall within a frequency range utilized by cellular telephones in the United States. High-pass filter 187 can be further modified to allow for cellular telephone frequency ranges of countries other than the United States. Specific design parameters of such a high-pass filter are left to the discretion of the manufacturer of a cellular telephone such as cellular telephone 12. Display 180 can be any type of display device which visually presents data to a cellular telephone user.

Display devices such as a light-emitting diode panel or liquid crystal display can be utilized to implement display 180. Keypad 140 is a set of keys that are mounted on a small keyboard and are dedicated to a specific purpose, such as inserting numbers. Keypad 140 is preferably modeled on the standard telephone keypad. Control signals 131 TX ENABLE and 132 RX ENABLE of microcomputer 130 enable cellular transmitter 124 and cellular receiver 122, respectively. In addition to control signals 131 and 132 to cellular transceiver 120, microcomputer 130 also monitors control signals 133 RSSI, 134, RX DATA, and 135 TX DATA for detecting signal strength, for detecting receive data and for sending transmit data, respectively, utilized in operation of cellular transceiver 120. Audio Circuitry 126 is coupled to audio switch 150 via control signals RX Audio and TX Audio.

Figure 3:
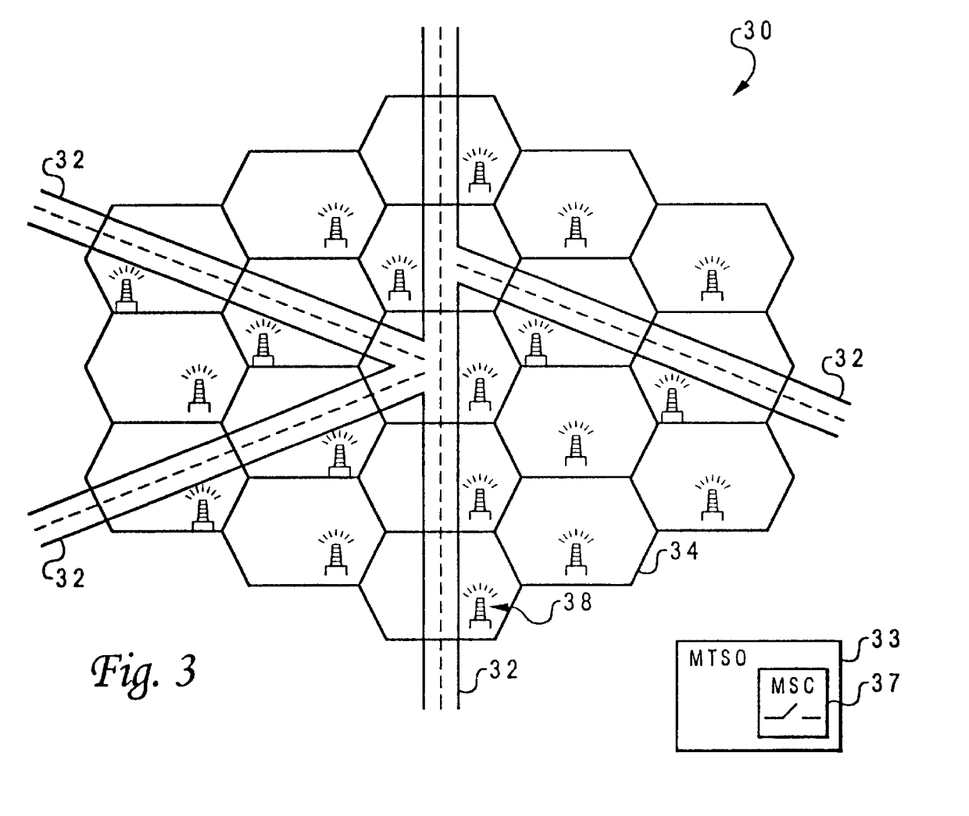
FIG. 3 illustrates a pictorial representation illustrative of a cellular telephone system in which a preferred embodiment of the present invention may be implemented.

FIG. 3 depicts a pictorial representation illustrative of a cellular telephone system 30 in which a preferred embodiment of the present invention can be implemented. Cellular telephone system 30 is analogous to cellular telephone system 10 depicted in FIG. 1, and may incorporate utilization of communications devices such as cellular telephone 12 depicted in FIG. 2. Cellular telephone system 30 is composed of a variety of cells 34. Each cell encompasses a specified geographic area. Each geographic area has its own base station 38 and a single controller (not shown) interconnected with a public telephone network. Each cell 34 sits adjacent another cell to create a honeycomb pattern of cells. Cells 34 can cover a large metropolitan area. Each cell 34 can have a radius of about 13 to 19 km (8 to 12 miles), depending upon the strength of each base station 38.

Specific cell radii are not necessary features of the present invention. Cells can have ranges as low as several hundred feet up to approximately 25 miles in radius. The specific numbers described herein are for demonstrative purposes only and are not necessary features of the present invention. Although not depicted in FIG. 3, each cell 34 can be further subdivided into still smaller cells. In this way, the honeycomb pattern of cells 34 can repeatedly utilize the same range of radio frequencies without interfering with one another, so long as neighboring cells 34 do not utilize precisely the same radio channels.

Although not shown in FIG. 3, each cell 34 can include six directional antennas, centrally located in each cell 34, each radiating into a sixty degree section of each cell. A plurality of cells 34 are combined to form cellular telephone system 30 covering a particular geographic area. This cellular system enables mobile cellular telephone traffic to communicate with landline telephone networks and other mobile cellular telephones while moving through the geographic area. Each cell 34 also has a number of frequencies, transmitted by low power transmitters, assigned to it that cannot be utilized in adjacent cells because of frequency interference problems. Due to the low power of each cell's transmitter, however, the same frequency can be re-utilized in other cells, referred to as co-channel cells in the same metropolitan area.

Cellular telephone system 30 is an example of a cellular mobile service, a communications service that allows a user to access the public telephone network from a stationary or moving vehicle, and which is based on a combination of radio transmission and telephone switching. Individuals with small mobile telephones can utilize this system in the same way that telephone calls are made utilizing standard carriers. The cellular mobile service thus provides a communication link to the user by segmenting a large geographic area into smaller areas (i.e., cells).

Cellular telephone system 30 can include cellular subscriber units which may be mobile or portable. Each base station 38 is connected to the public telephone company (i.e., TELCO) via one or more cellular switching networks (not shown). Each cellular subscriber has an assigned cellular telephone number that allows the user to place and receive calls within a widespread range of each base station 38, such as throughout a metropolitan area. During a cellular telephone call, when a mobile cellular telephone moves from one cell to another, it must be handed-off to the next cell in order to continue communicating. This procedure is accomplished as follows for the analog cellular system. The cell serving the mobile cellular telephone and neighboring cell sites scans (i.e. takes samples of) the received mobile cellular telephone signal strength. This information is collected at a switch and a decision is made whether to hand-off the mobile cellular telephone call to a neighboring cell.

For the U.S. Digital Cellular System, as outlined in the Electronic Industries Association/Telecommunications Industry Association (EIA/TIA) Standard IS-54 document, the mobile cellular telephone also collects channel quality information (channel bit error rate (BER) and signal strength) on its own channel and signal strength measurements on neighboring cell channels. This information is transmitted to the serving cell site as a mobile assisted hand-off (MAHO) message to be added to the base scan information for making a hand-off decision. Such hand-off procedures can be utilized with the cellular telephone system described herein; however, such hand-off procedures are not necessary features of the present invention only and are merely included to describe one particular embodiment of the present invention.

A street or road 32, such as a metropolitan highway, is depicted as extending through cells 34 contained within cellular telephone system 30. Thus, a user can travel along road 32 through cells 34 and while travelling, perform cellular mobile telephone operations. Cellular telephone system 30 further includes a mobile telephone switching office (MTSO) 33, a central office for mobile switching in cellular telephone system 30. MTSO 33 houses a mobile switching center (MSC) 37, and fielded monitoring and relay stations (not shown) for switching calls from cell sites to wire line central offices such as (TELCO) 14 depicted in FIG. 1, or a public switched telephone network (PSTN), made up of local networks, exchange area networks, and long-haul networks that interconnect telephones and other communication devices on a worldwide basis. MSC 37 can control system operations in analog cellular networks. For example, MSC 37 can control calls, track billing information, and locate cellular subscribers. MSC 37 is a switch that provides services and coordination between mobile cellular telephone users in a network such as cellular telephone system 30 and external networks.

Figure 4A:
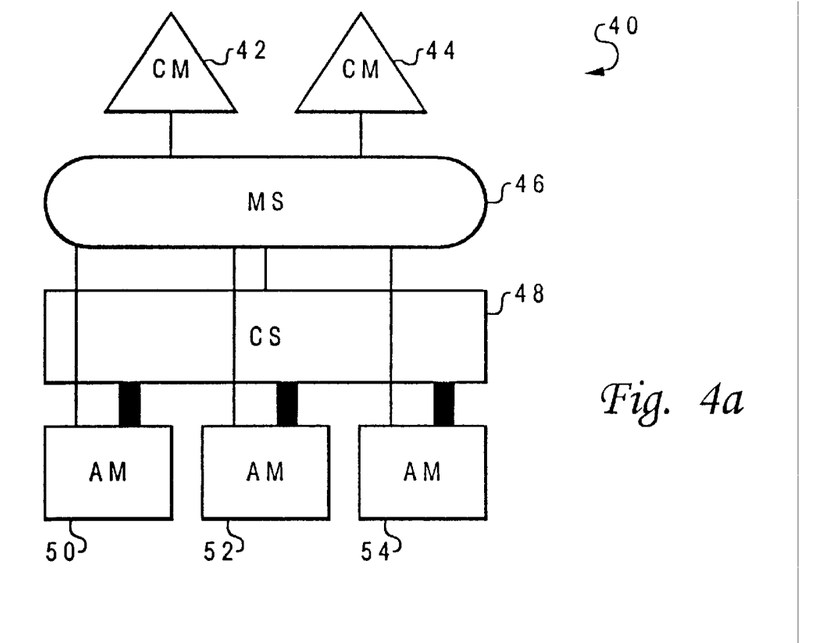
FIG. 4(a) depicts a block diagram illustrative of the physical elements of a switching system in accordance with a preferred embodiment of the present invention.
Figure 4B:
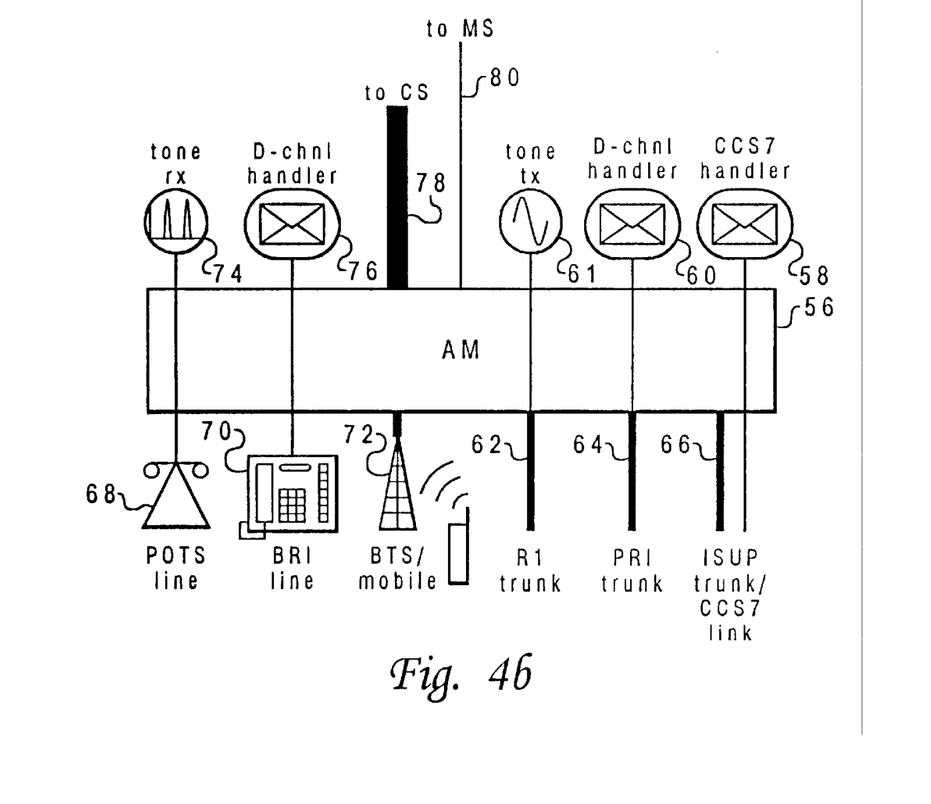
FIG. 4(b) illustrates a block diagram illustrative of an access module which can be utilized in accordance with the switching system depicted in FIG. 4(a)

In FIG. 4(*a*) and FIG. 4(*b*) like parts are indicated by like reference numerals. FIG. 4(*a*) depicts a block diagram illustrative of the physical elements of a switching system 40 in accordance with a preferred embodiment of the present invention. Those skilled in the art will appreciate that although switching system 40 may be utilized in association with a communications system such as cellular telephone system 10 of FIG. 1 or cellular telephone system 30 of FIG. 3 to transfer and redirect calls, other communications systems, such as wireline-based systems or a combination of wireline and wireless systems may also be utilized in accordance with a preferred embodiment of the present invention. Those skilled in the art will also appreciate that communication devices, whether portable or cellular based devices such as cellular telephone 12 of FIG. 2, are not necessary features of the present invention. Strictly wireline-based telephones may also be utilized in accordance with a preferred embodiment of the present invention.

Thus, switching system 40 includes computing modules (CMs) which run hardened, real-time operating systems. Thus, computing modules 42 and 44 are connected to message subscriber (MS) 46. Message subscriber 46 is in turn coupled to circuit switch (CS) 48. Circuit switch 48 is connected to three access modules (AMs) 50, 52, and 54, and provides switched connections between channels that appear on its links, which also access the message subscriber, computing modules, and access modules. The access modules function as host external interfaces. Lines provide subscriber interfaces. Trunks connect to other network elements, and signalling links carry messages to other network elements. A trunk, in a communications network, is a single transmission channel between two points that are switching centers or nodes. Specialized service circuits, such as conference bridges and announcements, support call processing (CP) applications.

Call processing software and algorithms are primarily executed on computing modules such as computing modules 42 and 44, along with operations, administration, and maintenance software. The access modules also contain devices that support these interfaces. For example, tone generators can send tones to lines and trunks. Receivers can detect dual-tone multifrequency (DTMF) and multifrequency (MF) digits on the lines and trunks utilized in association with switching system 40. Those skilled in the art of communications will appreciate that DTMF signaling is a form of multifrequency signaling that utilizes standard fixed combinations of two specific voice band frequencies, one from a group of four lower frequencies and the other from a group of four higher frequencies. DTMF signals, unlike dial pulses, can pass through an entire connection to a destination user, and thus lend themselves to various schemes for remote control after access (i.e., after the connection is established). MF signaling is signaling in which a combination of frequencies is utilized.

Other devices that can be utilized in association with an access module include ISDN (Integrated Services Digital Network) D-channel handlers that provide messaging to BRI lines and PRI trunks. An ISDN is a digital network in which the same time division multiplexed switches and digital transmission paths are utilized to establish connections for different services, such as voice, video, and data services that include electronic mail and facsimile.

FIG. 4(b) illustrates a block diagram illustrative of an access module 56 which can be utilized in accordance with the switching system depicted in FIG. 4(a). In FIG. 4(b), a specific example of a single representative access module (AM) 56 is depicted, which is analogous to access modules 50, 52, and 54. Access module 56 is thus coupled to a tone rx 74, a D-channel handler 76, a line 78 which in turn is coupled to computing module 48, and a tone tx 61. Access module 56 is also coupled to message subscriber 46 via line 80. In addition, access module 56 is connected to a D-channel handler 60 and a CCS7 handler 58. CCS7 handler 58 is a link handler that provides messaging to CCS7 signaling links. In addition, access module 56 is tied to a POTS line 68. "POTS" is an acronym representative of the term "plain old telephone service." POTS is a telephone service that provides voice and low speed digital data only and that utilizes wire pairs, such as twisted pairs and open wires, in loops, and is unable to convey video, high speed digital, and broadband analog signals. Access module 56 is further tied to a BRI line 70 and a BTS/mobile 72. BRI is an acronym representative of the term "basic rate interface." BRI, well known in the art of network communications, is a type of ISDN multipurpose interface communications standard utilized chiefly in communications networks that defines a network user access arrangement for simultaneous voice and data services.

BTS/mobile 72 provides a link to a wireless communications network such as cellular telephone system 30 depicted in FIG. 3. BTS mobile 72 is essentially a mobile interface to a base transmission station (BTS), which contains radio transmission equipment for each cell site, such as cells 34 depicted in FIG. 3. A BTS is one form of a base station, such as base station 38 depicted in FIG. 3. A typical BTS is connected to an access module utilizing ISUP trunks and CCS7 links such as those depicted at trunk 66 in FIG. 4(b). Additional trunks such as R1 trunk 62 and PRI trunk 64 are also connected to access module 56. Those skilled in the art will appreciate that access module 56 is a representative access module. Most access modules utilized in modern communications systems are specialized access modules and typically do not host as many different external interfaces as those depicted in FIG. 4(b) as attached to access module 56.

Figure 5A:
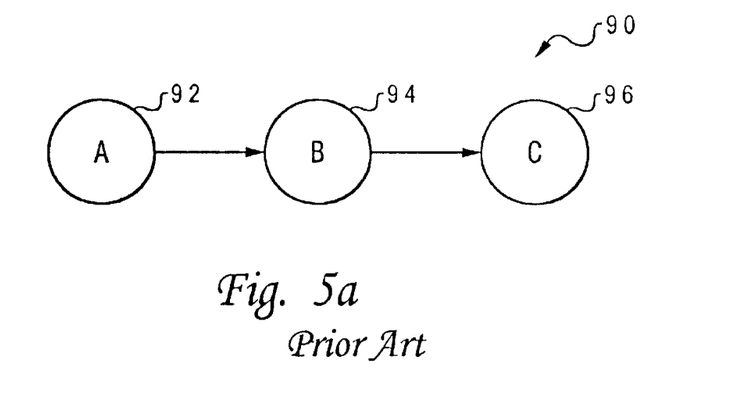
FIG. 5(a) illustrates a prior art call configuration.
Figure 5B:
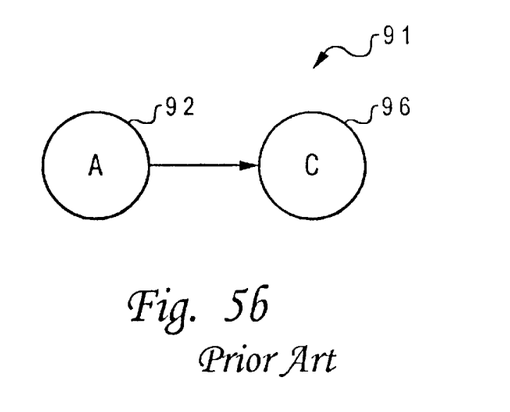
FIG. 5(b) depicts the prior art call configuration of FIG. 5(a) after redirection has occurred.
Figure 6:
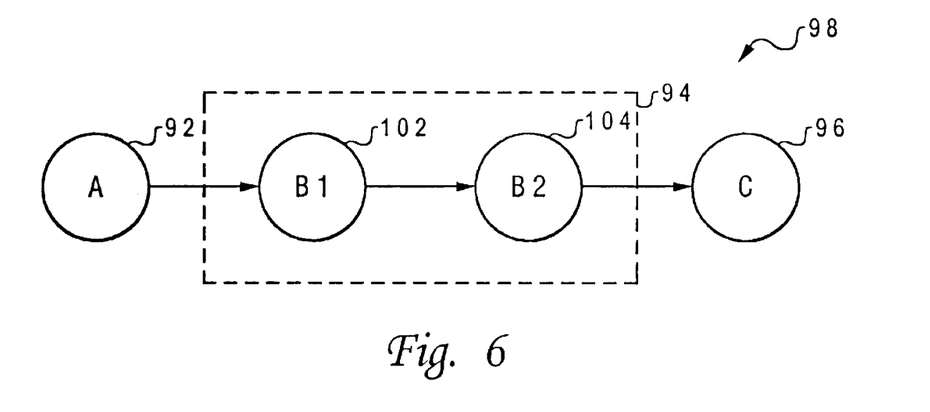
FIG. 6 depicts a call configuration in accordance with a preferred embodiment of the present invention.

In FIG. 5(a), FIG. 5(b), and FIG. 6, like parts are indicated by like reference numerals. FIG. 5(a) illustrates a prior art call configuration 90. FIG. 5(b) depicts the prior art call configuration of FIG. 5(a) after redirection has occurred. Prior art call configuration 90 of FIG. 5(a) is represented as prior art call configuration 91 in FIG. 5(b). Various supplementary services typically redirect calls on behalf of a user. Examples of such supplementary services include call forwarding, call transfer, release link trunking, and simultaneous ringing. Such supplementary services are often referred to as "features" of a particular switching systems such as switching system 40 depicted in FIG. 4(a). In call configuration 90, a call is placed from user A to user B. User A is depicted at 92, while user B and user C are respectively depicted at 94 and 96. User A is an originating user and user B is a desired terminating user. However, due to activation of a redirection service, the call is routed from user to B to user C. User C is an alternative terminating user.

In the approach depicted in call configuration 90, a call from user to A to user B, who redirects the call to user C, is represented as a call from user A to user C, such that user B has been largely removed from the configuration. However, the resulting user A to user C call contains special flags indicating that the call was actually redirected by user B. These special flags result in numerous software "hooks" that determine whether or not such flags have actually been set, and if so, are ordered to fix the behavior of what now (i.e., erroneously) appears to be a direct user A to user C call. Call setup and billing software, in particular, end up containing many such hooks, whose root cause is the removal of user B from the call configuration. This resulting design is highly error-prone and expensive to maintain, because as subsequently illustrated in FIG. 5(b), the call from user A to user B, which is redirected to user C, is represented as a call from user A to user C such that B has been essentially removed from the configuration.

FIG. 6 depicts a call configuration 98 in accordance with a preferred embodiment of the present invention. Call configuration 98 utilizes a virtual agent approach to solve the aforementioned problems associated with configuration 90 of FIG. 5. In FIG. 6, the virtual agent approach retains user B in the call configuration so that two calls still explicitly exist: A call from user A to user B and a call from user B to user C. In the case of simultaneous ringing, a number of calls are set up from user B: a call from user B to user C, a call from user to B to user D, a call from user B to user E, and so forth. When user B redirects a call, the software that is invoked to perform actions on the behalf of user B is altered. The new software is able to perform logical functions on behalf of user B, but such software undertakes no physical operations that affect user B's interface of terminal. In an object-oriented implementation, objects running on behalf of B can be replaced by either subclasses or superclasses in order to subtract some of the behavior that would occur when B is physically present in the call.

Thus, according FIG. 6, the call from user A to user B is chained to the user B to user C call such that two virtual agents, representing user B, tandem messages between user A and user C. These virtual agents are depicted as virtual agent B1 and virtual agent B2 respectively at 102 and 104. The configuration now becomes an A-B1-B2-C call configuration. If user A releases the call, for example, virtual agent B1 tandems the release message to virtual agent B2, which can then record the call disconnect time in billing data associated with user B before passing the release message on to user C. Software running on behalf of user A and user C is thus unaware that the call has been redirected and contains no software "hooks" to handle such situations.

Those skilled in the art will appreciate that although FIG. 6 illustrates one example of a preferred embodiment of the present invention in which a call is made from an originating user (i.e., user A) to a desired terminating user (i.e., user B), and then transferred to an alternative terminating user (i.e., user C), that combinations thereof may also be implemented in accordance with a preferred embodiment of the present invention. For example, a virtual agent as described herein can also connect two originating users or two terminating users in a variety of call combinations. The virtual agent can act as an intermediary in all four combinations of two calls, call #1 and call #2. The following combination of calls illustrates a configuration in which the virtual agent can act as an intermediary between calls:

call #1 originating (user A to user B), call #2 originating (user C to user B)

call #1 originating (user A to user B), call #2 terminating (user B to user C)

call #1 terminating (user B to user A), call #2 originating (user C to user B)

call #1 terminating (user B to user A), call #2 terminating (user B to user C)

Thus, in a call configuration in which a call #1 includes a call placed from an originating user A to a terminating user B, and a call #2 in which a call is made from an originating user C to a terminating user B, the virtual agent can act as an intermediary between originating user A of call #1 and originating user C of call #2. Likewise, in a call configuration in which a call #1 includes a call placed from an originating user A to a terminating user B, and a call #2 in which a call is made from an originating user B to a terminating user C, the virtual agent can act as an intermediary between originating user A of call #1 and terminating user C of call #2. In addition, in a call configuration in which a call #1 includes a call placed from an originating user B to a terminating user A, and a call #2 in which a call is made from an originating user C to a terminating user B, the virtual agent can act as an intermediary between terminating user B of call #1 and originating user C of call #2. Also, in a call configuration in which a call #1 includes a call placed from an originating user B to a terminating user A, and a call #2 in which a call is made from an originating user B to a terminating user C, the virtual agent can act as an intermediary between terminating user A of call #1 and terminating user C of call #2.

Figure 7:
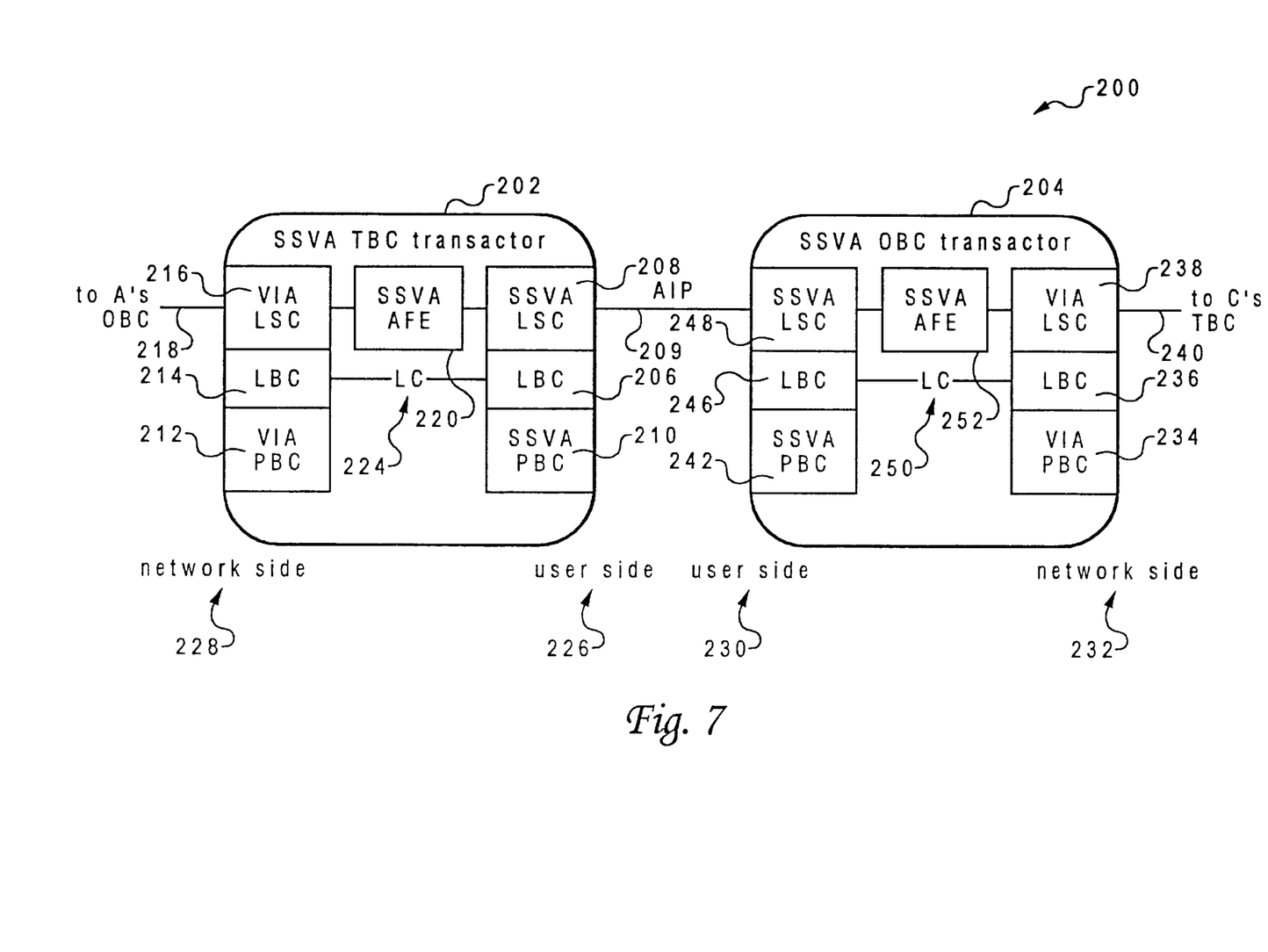
FIG. 7 illustrates a virtual agent framework utilized to forward a call in accordance with a preferred embodiment of the present invention.

FIG. 7 illustrates a virtual agent framework 200 utilized to forward a call in accordance with a preferred embodiment of the present invention. A feature (i.e., a supplementary service as described herein) is triggered or initiated at some point during a basic call, after which it modifies the behavior of the basic call. A feature-rich switch supports hundreds of features, ranging from the simple to complex. Most switches implement features by "hooking" basic call software, which includes many drawbacks. Numerous hooks obscure basic call logic, introduce bugs, and degrade real-time performance. Basic call software becomes a bottleneck as designers wait to add hooks. Feature-specific states can be added to the basic call arbitrarily. Interactions are intractable because there is no framework to handle situations in which more than one feature is active. Software ownership is problematic because each feature is scattered throughout basic call modules.

During redirection features such as Call Forwarding (CF) and Call Transfer (CT), the redirecting user is either removed from the call or not connected at all. Nonetheless, the call continues. If user B forward or transfers a call from user A to user C, the resulting call is physically represented as a call from user A to user C. However, user B logically remains part of the call and cannot be completely removed. There are various reasons to account for this. When a call is forwarded, the call is set up utilizing user B's subscriber profile. User C's address, for example, must be translated utilizing user B's translation scheme because it is user B, not user A, who provides the address. The user B to user C call is also charged to user B, who pays for it even though user B is not connected to the call. Finally, user B can call user A and user C and transfer the calls together.

User B has then connected two terminating basic calls (TBCs) and must therefore remain in the call to act as an interworking point because A's and C's TBCs cannot communicate directly. If user B is transferred prior to an answer, for example, A's TBC becomes "confused" if it received an answer from C. User B must intercept this message to prevent the message from reaching user A. The redirecting agent, user B, therefore remains in the A-to-C "call". Logically, two calls remain: A-B and B-C. However, according to a preferred embodiment of the present invention, B is "virtualized," which means that software associated with B does not perform physical functions such as creating connections or sending messages to user B. However, B's software continues to provide logical functions such as translations and billing.

FIG. 7 depicts a Supplementary Services Virtual Agent (SSVA), which represents one possible embodiment of the present invention. Such a framework is one type of a virtual agent framework that utilizes two SSVA portions to represent a redirecting party. The two portions can include an SSVA TBC transactor portion and an SSVA OBC transactor portion. Call Forwarding (CF) is an example of a feature based on this type of framework. Another possible configuration includes two OBC transactors or two TBC transactors. Call Transfer (CF) is an example of such a configuration.

In the example depicted in FIG. 7, virtual agent framework 200 is composed of two SSVA portions: an SSVA TBC transactor 202 and an SSVA OBC transactor 204. SSVA TBC transactor 202 is an SSVA Terminator Basic Call (TBC) transactor, and SSVA OBC 204 is an SSVA Originating Basic Call (OBC) transactor. SSCA TBC transactor 202 is linked to SSVA OBC transactor 204 via an Agent Interworking Protocol 209. Virtual agent framework 200 thus is a virtual agent representative of user B and is composed of two virtual agents, SSVA TBC transactor 202 and SSVA OBC transactor 204, which are respectively analogous to virtual agents 102 and 104 depicted in FIG. 6. Each virtual agent includes a network side and a user side. SSVA TBC transactor 202 includes a network side 228 and a user side 226, while SSVA OBC transactor 204 includes a user side 230 and a network side 232. SSVA TBC transactor 202 is linked to an Originating Basic Call (OBC) of user A via line 218, and SSVA OBC transactor 204 is linked to a Terminating Basic Call (TBC) of user C via line 240.

Each virtual agent includes a number of functional features. SSVA TBC transactor 202 includes a VIA LSC 216 and a Logical Bearer Channel (LBC) 214. VIA is an acronym representative of the term "Virtual Interworking Agency," and LSC is an acronym representative of the term "Logical Signalling Channel." An LSC is a software object associated with a message transport address (MTA). An MTA is an address at which messages can be sent and received. In software utilized in association with a preferred embodiment of the present invention, as described herein, all messages sent and received on an MTA belong to the same protocol.

The LSC verifies that messages sent and received on an associated MTA obey the protocol associated with the MTA. The LSC may also maintain a history of information sent received in those messages. A VIA is an MTA utilized for the agent interworking protocol (AIP), the universal protocol utilized between the two halves of a call. A VIA LSC is therefore an LSC that enforces AIP. Each call half has one VIA LSC, which communicates with its mate VIA LSC on the other call half. A VIA LSC is said to be on an associated call "network side," because the VIA LSC is directed toward the remote user. A call half also has a second LSC on its "user side". This LSC handles the protocol of an external interface, which results in terms such as MS LSC (i.e., for a mobile subscriber), ISUP LSC (i.e., for an ISUP trunk), and so forth.

SSVA TBC transactor 202 also includes a VIA PBC 212. PBC is an acronym representative of the phrase "Physical Bearer Channel." VIA LSC 216 is linked via an SSVA AFE 220 to SSVA LSC 208. AFE is an acronym representative of the phrase, "Active Feature Element." A logical connection (LC) 224 connects LBC 214 to LBC 206 within SSVA TBC transactor 202. VIA LSC 216, LBC 214 and VIA PBC 212 are designated as belonging to the network side 228 of SSVA TBC transactor 202. SSVA LSC 208, LBC 206 and SSVA PBC 210 belong to the user side 226 of SSVA TBC transactor 202. SSVA OBC transactor 204 includes features similar to those included with SSVA TBC transactor 202.

SSVA OBC transactor 204 includes an SSVA LSC 248 coupled to an SSVA AFE 252, which in turn is connected to a VIA LSC 238. A user side 230 of SSVA OBC transactor 204 includes SSVA LSC 248, LBC 246 and SSVA PBC 242. A network side 232 includes VIA LSC 238, LBC 236 and VIA PBC 234. LBC 236 is linked to LBC 246 via LC 250. Those skilled in the art will appreciate that clusters are formed based on these features. For example, a USC-UBC-UPBC cluster is formed within each virtual agent. A USC is a user side LSC (e.g., SSVA LSC 208), while a UBC is a user side LBC (e.g., LBC 206 and LBC 246). A UPBC is a PBC assigned to a UBC (e.g., user side LBC such as LBC 206). When a call is redirected, user B's USC-UBC-UPBC cluster is destroyed if B is connected to the call. A USC-UBC-UPBC cluster belonging to an SSVA is then created in each call. The two SSVA USCs tandem messages between their calls, and the two SSVA UPBCs tandem connection information.

In the same way that user B's USC cluster is replaced by an SSVA USC cluster, user B's basic call AFE is replaced by an SSVA basic call AFE. Because the call data in the original AFE must be preserved, however, this AFE is actually converted into an SSVA AFE rather than replaced by another feature. The SSVA AFE (e.g., SSVA AFE 220 and SSVA AFE 252) is actually a subclass of user B's original basic call AFE, which allows the SSVA AFE to reuse or override user B's behavior. However, because many SSVA behaviors are common to all virtualized agents, an abstract SSVA basic call subclass is also defined directly below the basic call subclass. The class hierarchy for a mobile basic call therefore contains an abstract basic call AFE, subclassed by the abstract SSVA basic call AFE, subclassed by a message subscriber (MS) basic call AFE, and finally subclassed by an MS SSVA basic call AFE. The features, states, and event handlers associated with these AFEs follow the same inheritance pattern.

Each SSVA call contains an active service component which includes a state machine for such a service. This active service component modifies the behavior of the basic call and is referred to as a "modifier AFE." Thus, each SSVA call contains a modifier AFE for the redirecting features. This AFE raises a redirection event, which is defined by the abstract SSVA basic call AFE. The SSVA's redirection event handler releases user B's USC cluster if it exists, morphs B's basic call AFE to its SSVA subclass, creates an SSVA USC cluster, and allocates a second SSVA MTA to act as the mate of an SSVA MTA that is associated with the new SSVA USC. Note that MTA is an acronym representative of the phrase "Message Transport Address." An MTA is typically utilized in the handling of incoming messages in run-time systems. An incoming byte stream is addressed to an MTA. When an I/O (i.e., input/output) handles receives a byte stream, it invokes the input handler associated with the MTA specified in the byte stream. The next action depends on the aforementioned redirection operation, which is either Originate (i.e., to create a new call) or Join (i.e., to connect two existing calls). The former is utilized by call forwarding and similar features, and the latter is utilized by call transfer and similar features.

In the Originate operation, an SSVA sends an Origination message to the mate SSVA MTA to create an SSVA OBC. This message is actually an AIP IAM. IAM is an acronym for "Initial Address Message." The AIP IAM contains physical parameters that are derived from an original AIP IAM sent from user A to user B, but whose logical parameters are utilized to set up the B-to-C call. For example, A's connection information and the calling address are physical parameters, whereas the redirecting and called addresses are logical parameters. Another logical parameter is a feature activator for the redirecting feature, which causes an associated AFE to be created as a modifier of the SSVA OBC. Setup of the B-to-C call then proceeds in a usual manner.

In the Join operation, the SSVA sends a Join message to the mate SSVA MTA after associating the SSVA MTA with the target call. When this message arrives at its target, no LSC is found for the SSVA MTA, and so the SSVA USC cluster is created. This message simply contains a feature activator for the redirecting feature, which causes its AFE to be created as a modifier of the target basic call. The redirecting feature initiates the release of the original USC and then connects a network-based LBC to the SSVA UBC in order to join the two remote parties, user A and user C.

After the two SSVA calls establish communication, they tandem AIP messages between user A and user C while continuing to perform logical operations such as billing. The modifier AFEs remain on both SSVA calls to provide any special behavior. When an AIP REL arrives from either A or C, the SSVA calls idle themselves and tandem the AIP REL to a remote party. REL is a release message.

Figure 8:
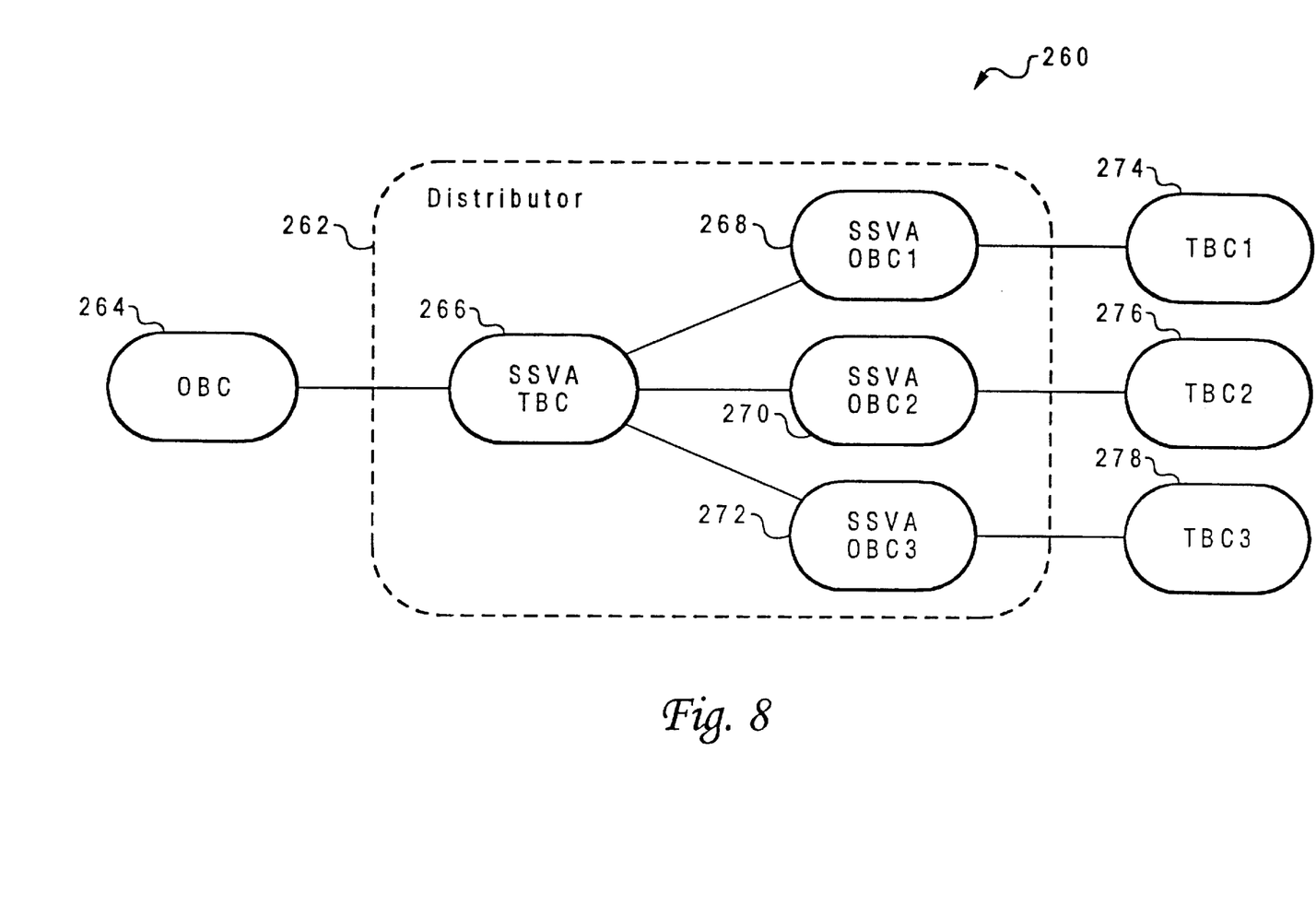
FIG. 8 depicts a call distributor pattern of a call to multiple destinations, in accordance with a preferred embodiment of the present invention.

FIG. 8 depicts a call distributor pattern 260 of a call to multiple destinations, in accordance with a preferred embodiment of the present invention. Some features present a call to multiple destinations. The first destination to answer may be awarded the call, with the other destinations being released. In another variation, the call continues at all destinations, and any destination that answers is conferenced into the call. A distributor pattern is utilized to present a call to multiple destinations. This distributor pattern closely resembles the SSVA redirection pattern. However, the distributing feature, which is a modifier of an SSVA TBC, creates multiple SSVA USCs, one for each destination. The resulting configuration is depicted in FIG. 8. Call distributor pattern 260 includes a distributor 262 which is composed of an SSVA TBC 266, an SSVA OBC1 268, an SSVA OBC2 270 and an SSVA OBC3 272 which are each linked to the SSVA TBC 266 which in turn is linked to OBC 264. SSVA OBC1 268 is linked to TBC1 274, while SSVA OBC2 270 is linked to TBC2 276, and SSVA OBC3 272 is linked to TBC3 278.

Figure 9:
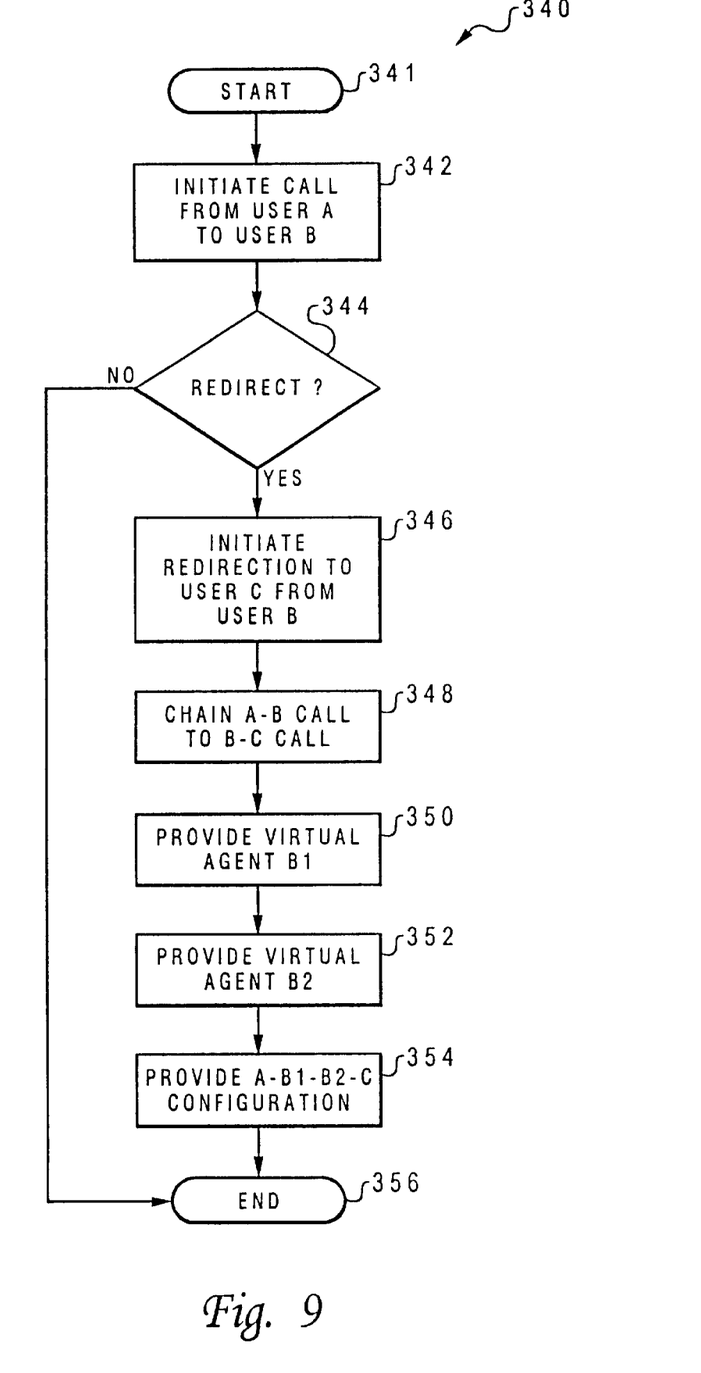
FIG. 9 illustrates a high-level flow chart of operations illustrative of a method in a cellular telephone network for providing virtual agents for telephony services, in accordance with a preferred embodiment of the present invention.

FIG. 9 illustrates a high-level flow chart of operations 340 illustrative of a method in a cellular telephone network for providing restricted user termination areas based on the location of an originator and a terminator, in accordance with a preferred embodiment of the present invention. It can be appreciated by those skilled in the art that FIG. 4 presents a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind.

The present invention relates to method steps for processing electrical or other (e.g. mechanical, chemical) physical signals to generate other desired physical signals, and can be implemented via a computer such as microcomputer 130. However, it is not necessary to maintain within a computer memory of a cellular telephone, instructions implementing these method steps. Such instructions can be maintained with a computer memory at a cellular telephone base station or a central broadcasting center from which such base stations receive instructions. Implementation of the method described herein is left to the discretion of a particular cellular telephone system designer.

It can be appreciated by one skilled in the art that the methods or processes described herein can be implemented as a program product, such as a control program residing with a computer memory and containing instructions that when executed on a CPU, will carry out the operations depicted in the logic flow charts described herein. It is important to note that, while the present invention can be described in the context of a fully functional computer system, those skilled in the art can appreciate that the present invention is capable of being distributed as a program product in a variety of forms, and that the present invention applies equally, regardless of the particular type of signal-bearing media utilized to actually carry out the distribution. Examples of signal-bearing media include: recordable-type media, such as floppy disks, hard-disk drives and CD ROMs, and transmission-type media, such as digital and analog communication links.

Thus, as depicted at block 341, the process steps depicted in FIG. 9 are initiated. As illustrated at block 342, a call is initiated from user A to user B. User A is an originating node and user B is a desired terminating node. As depicted at block 344, a test is performed to determined whether or not to redirect the call. In essence, the test determines whether or not a feature such as call forwarding should be initiated. It the answer is "no," then the process ends simply, as described at block 356. If, however, the answer is "yes," then as indicated at block 346, redirection is initiated from user B to user C, wherein user C is an alternative terminating node. As described at block 348, the A-B call is then chained to the B-C call.

As illustrated at block 350, a virtual agent B1 is provided. As described at block 352, a virtual agent B2 is also provided. These virtual agents function according to the virtual agents described herein. In essence, the virtual agent is a subset of a physical agent. When the user is no longer connected to the call, the virtual agent does not perform any interface or terminal operations, but will perform logical functions such as call setup and billing. As illustrated at block 354, a call configuration composed of A-B1-B2-C is then provided such that virtual agents B1 and B2 function to tandem messages between user A and user C. Thus, the virtual agents act as messengers to relay requests between two separating interworking agents (i.e., A and C). The process then ends, as described at block 356.

Preferred implementations of the invention can include implementations to execute the method or methods described herein as a program product residing in a memory of microcomputer 130, as depicted at FIG. 2. Alternatively, a preferred embodiment of the present invention can include a program product residing in a microcomputer memory located at an MSC (i.e., "MSC" is an acronym for "mobile switching center"). An MSC typically controls system operations in cellular networks. For example, an MSC can control calls, track billing information, and locate cellular subscribers. The program product thus includes sets of instructions for executing the method and systems described herein. Until required by the microcomputer, the set of instructions may be stored as a computer-program product in another computer memory, for example, in a disk drive attached to the microcomputer (which may include a removable memory such as an optical disk or floppy disk for eventual use in the disk drive).

Further, the computer-program product can also be stored at another computer and transmitted when desired to the user's workstation by a network or by an external network. One skilled in the art can appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements.

Note that the invention describes terms such as associating, initiating, terminating, routing or other such terms that could be associated with a human operator. However, for at least a number of the operations described herein which form part of at least one of the embodiments, no action by a human operator is desirable. As indicated herein, these operations described are, in large part, machine operations processing electrical signals to generate other electrical signals. Thus, a method for implementing the steps depicted in FIG. 9 can be accomplished with a computer-aided device.

It is important to note that it is not a necessary feature of the present invention that both parties in a communications transaction be mobile cellular telephone users. In particular, an originator does not necessarily have to be a mobile cellular telephone. For example, if a terminating user is a mobile cellular telephone, and an individual located in a different city calls the terminating user, the terminating user may desire the call routed to a central dispatcher in order to service the call quickly. In this case, the originator may be a mobile cellular telephone located in the other city, or the originator may be a fixed landline that is always located in the other city.

Those skilled in the art will appreciate that the present invention is useful to a terminating user regardless of the specific telephone type utilized by an originating user to initiate a communications transaction to the terminating user. Those skilled in the art will also appreciate that the virtual agent framework described herein can establish communications transactions not only between a single originating and terminating user, but also can connect two or more originating users or two or more terminating users, or a combination thereof, as long as the virtual agent framework functions as an intermediary.

The embodiments and examples set forth herein are presented in order to best explain the present invention and its practical application and to thereby enable those skilled in the art to make and utilize the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method in a communications network for managing multipath calls by establishing virtual communications nodes for effectively handling the automatic routing of communications transactions initiated within said communications network, comprising the steps of:

initiating a communications transaction from an originating node to a desired terminating node;

determining that said communications transaction includes a feature activator;

automatically routing said communications transaction from said originating node to an alternative terminating node, in response to said feature activator being present in said communications transaction, by:

associating a first virtual communications node with a first terminal of said desired terminating node;

associating a second virtual communications node with a second terminal of said desired terminating node; and terminating said communications transaction at said alternative terminating node by routing said communications transaction through said first virtual communications node and said second virtual communications node such that a multipath call placed from said originating node to said alternative terminating node is represented as a group of series of connections rather than a direct connection between said originating node and said alternative terminating node.

2. The method of claim 1 wherein the step of associating a first virtual communications node with a first terminal of said desired terminating node, further comprises the step of:

associating a first virtual agent with a first terminal of said desired terminating node.

3. The method of claim 2 wherein the step of associating a second virtual communications node with a second terminal of said desired terminating node, further comprises the step of:

associating a second virtual agent with a second terminal of said desired terminating node.

4. A system in a communications network for managing multipath calls by establishing virtual communications nodes for effectively handling the automatic routing of communications transactions initiated within said communications network, comprising:

means for initiating a communications transaction from an originating node to a desired terminating node;

means for determining that said communications transaction includes a feature activator;

means for automatically routing said communications transaction from said originating node to an alternative terminating node, in response to said feature activator being present in said communications transaction;

means for associating a first virtual communications node with a first terminal of said desired terminating node;

means for associating a second virtual communications node with a second terminal of said desired terminating node; and terminating means for terminating said communications transaction at said alternative terminating node by routing said communications transaction through said first virtual communications node and said second virtual communications node such that a multipath call placed from said originating node to said alternative terminating node is represented as a group of series of connections rather than a direct connection between said originating node and said alternative terminating node.

5. The system of claim 4 wherein said means for associating a first virtual communications node with a first terminal of said desired terminating node, further comprises:

means for associating a first virtual agent with a first terminal of said desired terminating node.

6. The system of claim 5 wherein said means for associating a second virtual communications node with a second terminal of said desired terminating node, further comprises:

means for associating a second virtual agent with a second terminal of said desired terminating node.

7. A program product residing in a computer system in a communications network for managing multipath calls by establishing virtual communications nodes for effectively handling the automatic routing of communications transactions initiated within said communications network, comprising:

instruction means within said computer system for initiating a communications transaction from an originating node to a desired terminating node;

instruction means for determining that said communications transaction includes a feature activator;

instruction means within said computer system for automatically routing said communications transaction from said originating node to an alternative terminating node, in response to said feature activator being present in said communications transaction;

instruction means within said computer system for associating a first virtual communications node with a first terminal of said desired terminating node;

instruction means within said computer system for associating a second virtual communications node with a second terminal of said desired terminating node; and instruction means within said computer system for terminating said communications transaction at said alternative terminating node by routing said communications transaction through said first virtual communications node and said second virtual communications node such that a multipath call placed from said originating node to said alternative terminating node is represented as a group of series of connections rather than a direct connection between said originating node and said alternative terminating node.

8. The program product of claim 7 wherein said instruction means within said computer system for associating a first virtual communications node with a first terminal of said desired terminating node, further comprises:

instruction means within said computer system for associating a first virtual agent with a first terminal of said desired terminating node.

9. The program product of claim 8 wherein said instruction means within said computer system for associating a second virtual communications node with a second terminal of said desired terminating node, further comprises:

instruction means within said computer system for associating a second virtual agent with a second terminal of said desired terminating node.

10. The program product of claim 9 wherein each of said instruction means within said computer system is provided to said computer system via signal bearing media.

11. The program product of claim 10 wherein said signal bearing media further comprises transmission media.

12. The program product of claim 10 wherein said signal bearing media further comprises recordable media.

* * * * *